United States Patent
Zhang et al.

(10) Patent No.: US 10,827,526 B2
(45) Date of Patent: Nov. 3, 2020

(54) METHOD OF CONTROLLING DATA TRANSMISSION IN A WIRELESS MESH NETWORK AND NODE THEREOF

(71) Applicants: AGENCY FOR SCIENCE, TECHNOLOGY AND RESEARCH, Singapore (SG); SINGAPORE POWER LTD, Singapore (SG)

(72) Inventors: Qingjun Zhang, Singapore (SG); Yuen Sam Kwok, Singapore (SG); Alvis Kim Hoong Lee, Singapore (SG)

(73) Assignee: AGENCY FOR SCIENCE, TECHNOLOGY AND RESEARCH, Singapore (SG)

(*) Notice: Subject to any disclaimer, the term of this patent is extended or adjusted under 35 U.S.C. 154(b) by 0 days.

(21) Appl. No.: 16/081,024

(22) PCT Filed: Feb. 28, 2017

(86) PCT No.: PCT/SG2017/050093
§ 371 (c)(1),
(2) Date: Aug. 29, 2018

(87) PCT Pub. No.: WO2017/151060
PCT Pub. Date: Sep. 8, 2017

(65) Prior Publication Data
US 2019/0090275 A1    Mar. 21, 2019

(30) Foreign Application Priority Data
Feb. 29, 2016  (SG) .......................... 10201601525Y

(51) Int. Cl.
*H04W 4/00*   (2018.01)
*H04W 74/08*  (2009.01)
(Continued)

(52) U.S. Cl.
CPC ... *H04W 74/0816* (2013.01); *H04W 72/0446* (2013.01); *H04W 72/082* (2013.01); *H04W 84/10* (2013.01); *H04W 84/18* (2013.01)

(58) Field of Classification Search
CPC .......... H04W 74/0816; H04W 72/082; H04W 72/0446; H04W 84/18; H04W 84/10
(Continued)

(56) References Cited

U.S. PATENT DOCUMENTS 8,483,616 B1   7/2013 Hall
8,942,197 B2   1/2015 Rucknick et al.
(Continued)

FOREIGN PATENT DOCUMENTS

CN          101291265 A    10/2008

OTHER PUBLICATIONS

IP Office of Singapore—Notification of Transmittal of the International Search Report & the Written Opinion of the International Searching Authority, or the Declaration, with the International Search Report & Written Opinion dated May 24, 2017 for International Application No. PCT/SG2017/050093 (11 pgs).
(Continued)

*Primary Examiner* — Mang Hang Yeung
(74) *Attorney, Agent, or Firm* — Womble Bond Dickinson (US) LLP

(57) ABSTRACT

There is provided a method of controlling data transmission in a wireless mesh network including a plurality of nodes capable of transmitting and receiving data packets. The method includes providing a frame comprising a plurality of time slots for data transmission, classifying the plurality of time slots into a plurality of sets of time slots, and determining, at a node of the plurality of nodes, a set of time slots amongst the plurality of sets of time slots for the node to transmit data packets, the set of time slots being determined
(Continued)

based on a hop count associated with the node. There is also provided corresponding node(s) in a wireless mesh network configured to perform data transmission in the above manner.

18 Claims, 6 Drawing Sheets

(51) Int. Cl.
*H04W 72/04* (2009.01)
*H04W 72/08* (2009.01)
*H04W 84/10* (2009.01)
*H04W 84/18* (2009.01)

(58) Field of Classification Search
USPC .......................................................... 370/329
See application file for complete search history.

(56) References Cited

U.S. PATENT DOCUMENTS

| | | | |
|---|---|---|---|
| 2007/0171819 A1 | 7/2007 | Julian et al. | |
| 2007/0280187 A1* | 12/2007 | Wang | H04L 63/1416 |
| | | | 370/338 |
| 2015/0071279 A1* | 3/2015 | Wang | H04W 12/06 |
| | | | 370/348 |
| 2016/0066319 A1* | 3/2016 | Sakata | H04B 7/2121 |
| | | | 370/336 |

OTHER PUBLICATIONS

Al-Hemyari, A., et al., "Centralized Routing and Scheduling Using Multi-Channel System Single Transceiver in 802.16d." *International Conf. on Ad Hoc Networks 2009*, LNISCST 28 (Sep. 22, 2008) pp. 316-322 (Section: Collision Avoidance Scheduling Algorithm) Selangor, Malaysia.

Cheng, H., et al., "Determined Scheduling Algorithms for Channel Access in Wireless Mesh Networks." *IEEE Int'l. Conference on Networking, Sending and Control*, Apr. 6-8, 2008, pp. 277-282 (Sect. IV). Sanya, China.

Cheng, H., et al., "Distributed Access Scheduling Algorithms in Wireless Mesh Networks."—*22nd Int'l Conference on Advanced Information Networking and Applications*, Mar. 25-28, 2008, pp. 509-516 (Sect. 4.2). Okinawa, Japan.

* cited by examiner

Hop N Ring

METHOD OF CONTROLLING DATA TRANSMISSION IN A WIRELESS MESH NETWORK AND NODE THEREOF

CROSS-REFERENCE TO RELATED APPLICATIONS

This patent application is a U.S. National Phase application under 35 U.S.C. § 371 of International Application No. PCT/SG2017/050093, filed on 28 Feb. 2017, entitled METHOD OF CONTROLLING DATA TRANSMISSION IN A WIRELESS MESH NETWORK AND NODE THEREOF, which claims the benefit of priority of Singapore Patent Application No. 10201601525V, filed 29 Feb. 2016, the contents of which were incorporated by reference in their entirety for all purposes.

TECHNICAL FIELD

The present invention generally relates to a method of controlling data transmission in a wireless mesh network and corresponding node(s) in the wireless mesh network.

BACKGROUND

With the development of Smart Grid and Internet of Things (IoT) technique, large scale wireless mesh network are becoming common. A large scale wireless mesh network may involve hundreds of nodes which are wirelessly connected to each other by one or more links (e.g., radio frequency communication channels). Data transmission may go through tens of hops via multiple nodes in the wireless mesh network. Accordingly, the data transmission of each node may need to compete for the precious wireless medium with the data transmissions of hundreds of other nodes in the wireless mesh network.

Carrier Sense Multiple Access (CSMA) and Time Division Multiple Access (TDMA) are two conventional protocols for coordinating/controlling data transmission by nodes in a wireless mesh network.

Generally, CSMA is a probabilistic Media Access Control (MAC) protocol in which a node verifies the absence of other traffic before transmitting on a shared physical medium. The node verifies the absence of other traffic by listening/sensing for network signals before attempting to transmit data packets. If a network signal is sensed, the node waits for the transmission to end before retrying to transmit its data packets. On the other hand, if no network signal is sensed, the node may then proceed to transmit its data packets. The conventional CSMA protocol may be efficient when the wireless mesh network scale is small. However, when the number of nodes increases, the number of collisions of data transmissions by nodes may increase significantly, thus making the network perform very poorly or inefficiently.

Generally, TDMA is a MAC protocol which allows multiple nodes to share and use the same transmission channel by dividing signals into different time slots. Multiple nodes transmit in rapid succession, and each node uses their own time slot. This allows multiple nodes to share the same transmission medium (frequency channel). Accordingly, TDMA requires time synchronization and slot reservation for collision free transmission. Thus, TDMA may avoid data collision at the cost of software (broadcast of transmission schedule) and hardware (precise timing). The conventional TDMA protocol may work well when the wireless mesh network scale is one to two hops but if the hop count goes up, the difficulty in scheduling the transmission over the entire wireless mesh network may make TDMA impossible or impractical to implement.

A need therefore exists to provide a method of controlling data transmission in a wireless mesh network, and node(s) thereof that seek to overcome, or at least ameliorate, one or more of the deficiencies of conventional approaches in controlling data transmission in a wireless mesh network. It is against this background that the present invention has been developed.

SUMMARY

According to a first aspect of the present invention, there is provided a method of controlling data transmission in a wireless mesh network, the wireless mesh network comprising a plurality of nodes capable of transmitting and receiving data packets, the method comprising:
providing a frame comprising a plurality of time slots for data transmission;
classifying the plurality of time slots into a plurality of sets of time slots; and
determining, at a node of the plurality of nodes, a set of time slots amongst the plurality of sets of time slots for the node to transmit data packets, the set of time slots being determined based on a hop count associated with the node.

In various embodiments, said classifying the plurality of time slots comprises classifying the plurality of time slots into a number of sets of time slots, the number of sets of time slots being determined based on an interference range of the node.

In various embodiments, the number of sets of time slots is determined based on the number of hops, from the node to one or more other nodes in the plurality of nodes, being within the interference range.

In various embodiments, the number of sets of time slots is determined to be equal to or greater than said number of hops plus two.

In various embodiments, the determined set of time slots is determined amongst the plurality of sets of time slots based on the hop count associated with the node and the number of sets of time slots.

In various embodiments, the determined set of time slots is determined amongst the plurality of sets of time slots based on a value obtained from the hop count associated with the node modulo the number of sets of time slots.

In various embodiments, the plurality of sets of time slots is located separate from each other and in time order in the frame, and the determined set of time slots has a time order associated therewith in the frame satisfying a predefined relationship to said value obtained.

In various embodiments, the node is scheduled based on the frame to transmit data packets in the determined set of time slots, and the node is configured to randomly select a time slot in the determined set of time slots for transmitting the data packets.

In various embodiments, the node is further configured to perform a delay for a random time period from a start of the selected time slot prior to transmitting the data packets.

In various embodiments, the node is configured to transmit data packets at the selected time slot based on a Carrier Sense Multiple Access (CSMA) protocol.

In various embodiments, one of the plurality of nodes is a base node, and the hop count of the node is determined based on the number of hops between the base node and the node.

In various embodiments, the frame further comprises one or more additional time slots reserved for CSMA back-off and auto-retransmission located adjacent an end of each of the plurality of sets of time slots.

According to a second aspect of the present invention, there is provided a node in a wireless mesh network comprising a plurality of nodes capable of transmitting and receiving data packets, the node comprising:

a frame module configured to provide a frame comprising a plurality of time slots for data transmission;

a classification module configured to classify the plurality of time slots into a plurality of sets of time slots; and a time slot determination module configured to determine a set of time slots amongst the plurality of sets of time slots for the node to transmit data packets, the set of time slots being determined based on a hop count associated with the node.

In various embodiments, the classification module is configured to classify the plurality of time slots into a number of sets of time slots, the number of sets of time slots being determined based on an interference range of the node.

In various embodiments, the number of sets of time slots is determined based on the number of hops, from the node to one or more other nodes in the plurality of nodes, being within the interference range.

In various embodiments, the determined set of time slots is determined amongst the plurality of sets of time slots based on the hop count associated with the node and the number of sets of time slots.

In various embodiments, the node is scheduled based on the frame to transmit data packets in the determined set of time slots, and the time slot determination module is further configured to randomly select a time slot in the determined set of time slot for transmitting the data packets.

In various embodiments, the node is configured to transmit data packets at the selected time slot based on a Carrier Sense Multiple Access (CSMA) protocol.

In various embodiments, one of the plurality of nodes is a base node, and the hop count of the node is determined based on the number of hops between the base node and the node.

According to a third aspect of the present invention, there is provided a computer program product, embodied in one or more computer-readable storage mediums, comprising instructions executable by one or more computer processors to perform a method of controlling data transmission in a wireless mesh network, the wireless mesh network comprising a plurality of nodes capable of transmitting and receiving data packets, the method comprising:

providing a frame comprising a plurality of time slots for data transmission;

classifying the plurality of time slots into a plurality of sets of time slots; and determining, at a node of the plurality of nodes, a set of time slots amongst the plurality of sets of time slots for the node to transmit data packets, the set of time slots being determined based on a hop count associated with the node.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Embodiments of the present invention provide a method of controlling data transmission in a wireless mesh network (or may interchangeably be referred to as a wireless ad-hoc network), and node(s) thereof that seek to overcome, or at least ameliorate, one or more of the deficiencies of conventional approaches in controlling data transmission in a wireless mesh network. For example, the method of controlling data transmission according to various embodiments of the present invention has been found to significantly improve data throughput in the wireless mesh network (including large scale mesh network) at low cost.

Figure 1A:
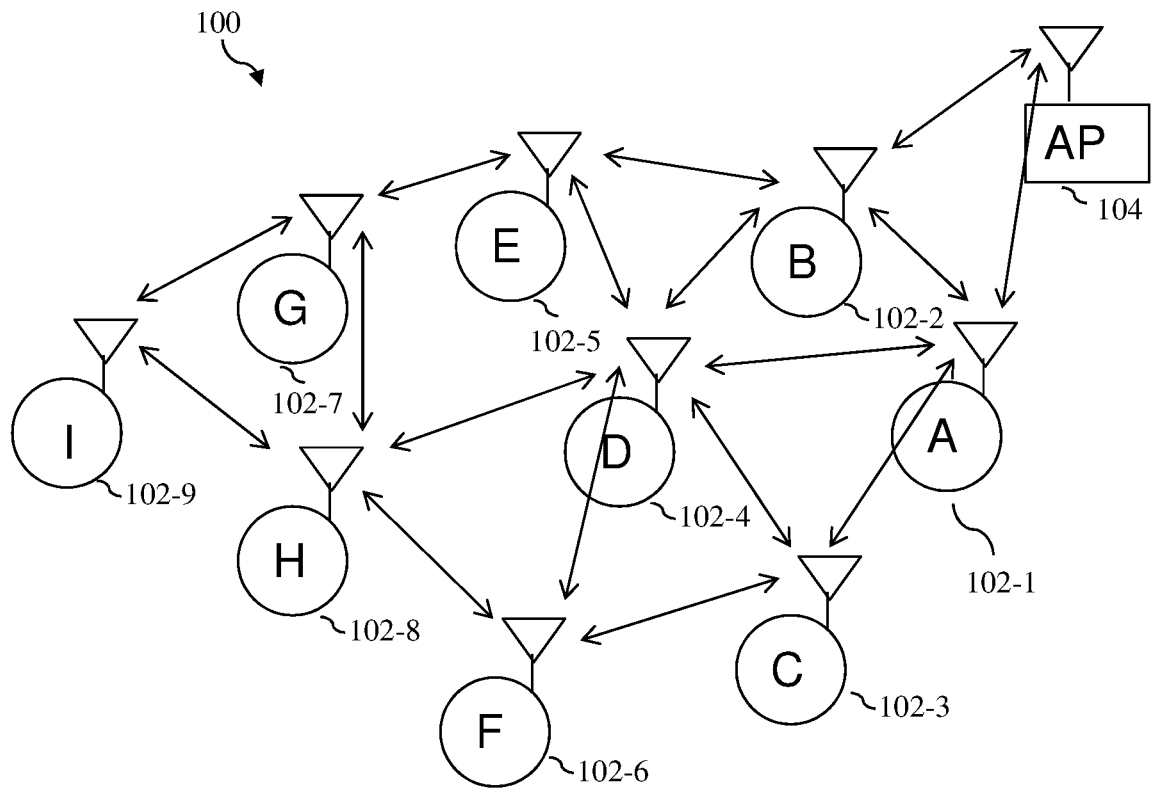
FIG. 1A depicts a schematic drawing of an exemplary wireless mesh network according to various example embodiments of the present invention.

FIG. 1A depicts a schematic drawing of an exemplary wireless mesh network 100 comprising a plurality of nodes 102-1 to 102-9 (referred to generally/collectively as nodes 102) according to various embodiments of the present invention. It will be appreciated by a person skilled in the art that the present invention is not limited to the number of nodes and their arrangements in the wireless mesh network as shown in FIG. 1A, and any number of nodes and various arrangements may be implemented in the wireless mesh network as desired or appropriate. The nodes 102 may be, for example, mobile/portable devices having wireless communication capabilities, and may be geographically distributed and wirelessly connected to each other by one or more links (e.g., radio frequency communication channels). Each node 102 may communicate directly with one or more nodes over a predetermined or short range which is a single hop away. Such nodes may be referred to as neighbour nodes. When a node transmits data packets to a destination node that is separated by more than one hop (e.g., the distance between the transmitter node and the destination node exceeds the radio transmission range of the transmitter node, or a physical barrier is present therebetween), the data packets may be relayed via one or more intermediate nodes (i.e., multi-hopping) until the data packets reach their final destination. As an example with reference to FIG. 1A, when node A 102-1 transmits data packets to destination node I 102-9, the data packets may be relayed through node D 102-4 and then node H 102-8 before reaching the destination node I 102-9. In the example, the destination node I 102-9 may thus be three hops away from the transmitter node A 102-1, or in other words, the hop count at the destination node I 102-9 with respect to the transmitter node A 102-1 may be three.

Accordingly, in a wireless mesh network such as shown in FIG. 1A, communications to and/or from nodes 102 may hop through each other to reach other nodes in the mesh network. The nodes 102 may each be a mobile/portable device or a fixed device having wireless communication capabilities and configured to be capable of transmitting and receiving data packets. In particular, the nodes 102 may exchange information as data packets transmitted over carrier frequencies, each of which includes one or more wireless communication channels. Furthermore, one or more access points (AP) 104 may be provided, each being capable of communicating with one or more of the nodes 102 (e.g., node A 102-1 and node B 102-2) in the network to provide one or more sources of the data packets.

Figure 1B:
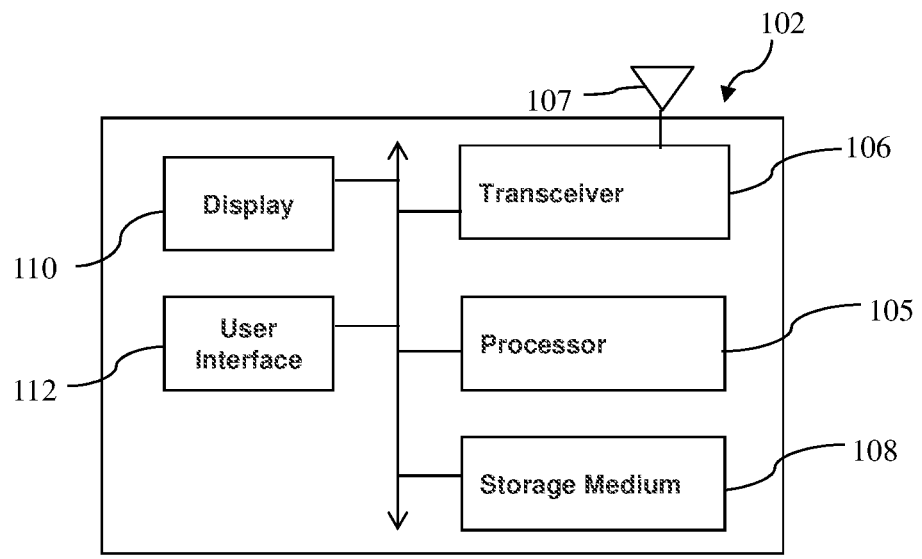
FIG. 1B depicts a schematic drawing of an exemplary node according to various example embodiments of the present invention.

By way of an example only and without limitation, FIG. 1B depicts a schematic drawing of an exemplary node 102. The node 102 may comprise a processor/controller 105 and a transceiver 106 coupled to an antenna 107 for receiving and transmitting signals, such as data packets, to and from the node 102, under the control of the processor 105. For example, the data packets may include voice, data or multimedia information (e.g., video information) and control signals, such as node update information. The node 102 may further comprise a storage medium 108 having stored therein various information such as computer executable instructions for performing various functions of the node 102 (e.g., receiving and transmitting signals) and routing information. The node 102 may also include a display 110 for displaying various information to a user, and a user interface 112 for receiving user inputs/commands for performing various functions.

When a node transmits a message, the wireless signal may cover a circular zone about the node. The circular zone may be divided into two zones/sections, namely, a transmission zone/section and an interference zone/section. In the transmission zone (or may interchangeably be referred to as communication zone), the signal strength is sufficiently strong for a node therein to receive the signal correctly. In the interference zone, the signal strength is too weak for a node therein to correctly receive the signal, but is too strong for the signal to be overlooked. The wireless signal thus becomes noise for nodes within the interference zone.

Figure 2:
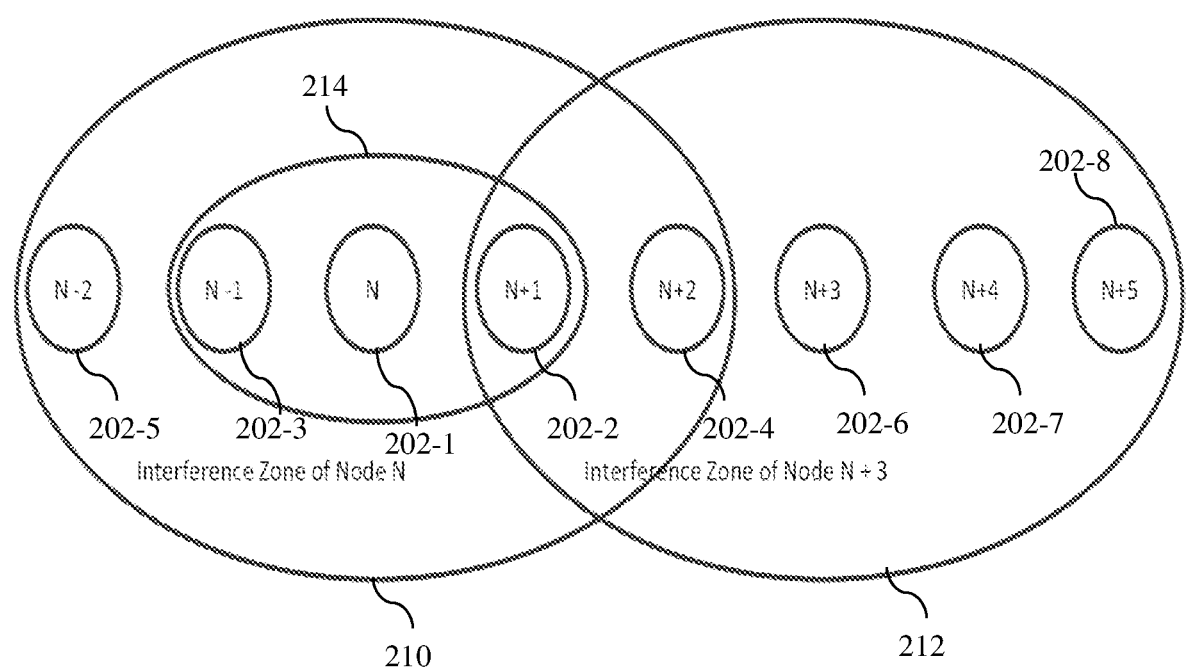
FIG. 2 depicts a schematic drawing of an exemplary wireless mesh network including nodes with different hop counts based on a linear deployment according to various example embodiments of the present invention.

For illustration purposes only and without limitation, FIG. 2 depicts a schematic drawing of an exemplary wireless mesh network according to various embodiments of the present invention. For simplicity, FIG. 2 shows a linear deployment of the exemplary wireless mesh network comprising a plurality of nodes 202-1 to 202-8 (referred to generally/collectively as nodes 202). In the example, assuming node 202-1 is a reference/base node, all other nodes may obtain their respective hop count (or hop count number) with respect to the base node accordingly as illustrated in FIG. 2. For example, with respect to node 202-1, nodes 202-2 and 202-3 has a hop count of one, nodes 202-4 and 202-5 has a hop count of two, node 202-6 has a hop count of three, node 202-7 has a hop count of four, and node 202-8 has a hop count of five. Assuming a two-hop interference (i.e., up to two hops from a node being within the interference range of the node), FIG. 2 also shows the interference zone 210 of node 202-1 and the interference zone 212 of node 202-6, as well as the transmission zone 214 of node 202-1, for illustration purposes only.

To avoid a collision in data transmission from multiple nodes, with reference to the exemplary wireless mesh network 200 shown in FIG. 2, when node 202-1 transmits a message to node 202-2, nodes 202-3 to 202-6 should not transmit messages. However, as an example problem associated with the conventional CSMA protocol, although nodes 202-2 to 202-4 would be aware of the data transmission from node 202-1 (i.e., through Request to Send (RTS) and Clear to Send (CTS) signals), for example, node 202-6 would be totally unaware of the data transmission from node 202-1. As a result, data transmission from node 202-6, which also cannot be detected/sensed by node 202-1, would cause the data packets to be lost at node 202-2. Accordingly, various deficiencies (e.g., multi-hop interference issues) exist in the conventional CSMA protocol and such deficiencies would only worsen significantly as the number of nodes increases.

Figure 3:
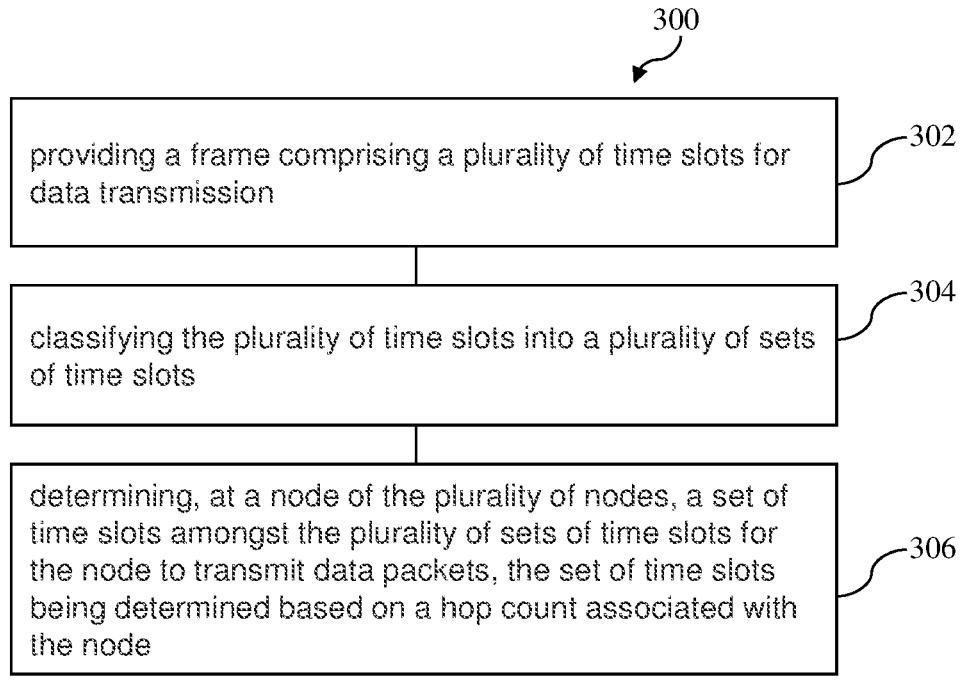
FIG. 3 depicts a flow diagram of a method of controlling data transmission in a wireless mesh network according to various embodiments of the present invention.

FIG. 3 depicts a flow diagram of a method 300 of controlling data transmission in a wireless mesh network comprising a plurality of nodes capable of transmitting and receiving data packets according to various embodiments of the present invention. The method 300 comprises a step 302 of providing a frame comprising a plurality of time slots for data transmission (e.g., partitioning a transmission time into the plurality of time slots), a step 304 of classifying the plurality of time slots into a plurality of sets of time slots (e.g., determining the number of sets of time slots), and a step 306 of determining, at a node of the plurality of nodes, a set of time slots amongst the plurality of sets of time slots for the node to transmit data packets, the set of time slots being determined based on a hop count associated with the node.

Accordingly, various embodiments of the present invention advantageously provide a hop-count based data transmission method/technique for a wireless mesh network to overcome, or at least ameliorate, one or more of the deficiencies of conventional approaches in controlling data transmission in a wireless mesh network. For example, since time slots are classified into a plurality of sets of time slots (e.g., time slots are grouped into multiple groups for different groups of nodes) and a set of time slots amongst the plurality of sets of time slots is determined for a node to transmit data packets based on a hop count associated with the node, sets of time slots are respectively and effectively assigned/reserved to the different groups of nodes (classified based on their hop counts). Accordingly, nodes having hop counts that may cause interference/collision if such nodes were to transmit data at the same time (e.g., nodes 202-1 and 202-4 in the example of FIG. 2) may be effectively classified/grouped into different groups and effectively assigned different sets of time slots, thus advantageously avoiding/minimizing interference/collision. Furthermore, since nodes having hop counts that may not cause interference/collision if such nodes were to transmit data at the same time (e.g., nodes 202-1 and 202-7 in the example of FIG. 2) may be effectively classified/grouped into the same group and effectively assigned the same set of time slots, thus advantageously improving data throughput in the wireless mesh network. Accordingly, interferences/collision between multiple nodes in the wireless mesh network may be significantly reduced, and at the same time, significantly improving data throughput in the wireless mesh network.

In various embodiments, the plurality of sets of time slots may be located separate from each other (i.e., no overlapping transmission time) and in time order in the frame. For example and without limitation, the plurality of sets of time slots may include a first set for a first group of nodes (e.g., classified or referred to as Group 0) including the base/reference node and node(s) having a hop count which is a multiple of a predetermined number (e.g., four), a second set for a second group of nodes (e.g., classified or referred to as Group 1) including node(s) having a hop count of one and node(s) having a hop count which after minus one is a multiple of the predetermined number, a third set for a third group of nodes (e.g., classified or referred to as Group 2) including node(s) having a hop count of two and node(s) having a hop count which after minus two is a multiple of a predetermine number plus two, and so on. Based on the example of FIG. 2, the first group of nodes (e.g., Group 0) may include nodes 202-1 and 202-7 (the base node and node having a hop count which is a multiple of the predetermined number four), the second group of nodes (e.g., Group 1) may include nodes 202-2, 202-3 and 202-8 (nodes having a hop count of one and node having a hop count of five which after minus one is a multiple of the predetermined number four), a third group of nodes (e.g., Group 2) may include nodes 202-4 and 202-5 (nodes having a hop count of two), a fourth group of nodes (e.g., Group 3) may include node 202-6 (node having a hop count of three). From the above example, for example, although nodes 202-2 and 202-3 are included in the same group and thus may belong to the same set of time slots, no interference/collision between the two nodes will occur since they are within the signal range of each other, and thus, each node is able to detect/sense signal from the other node and vice versa to avoid collision based on the Carrier Sense Multiple Access (CSMA) protocol. Accordingly, in various embodiments, each node of the plurality of nodes in the wireless is configured to transmit data packets in the determined set of time slots based on a CSMA protocol.

In various embodiments, the plurality of time slots is classified into a number of sets of time slots based on an interference range of the node. In further embodiments, the number of sets of time slots is determined based on the number of hops, from the node to one or more other nodes in the plurality of nodes, being within the interference range. In still further embodiments, the number of sets of time slots is determined to be equal to or greater than the above-mentioned number of hops plus two. For example, referring to the example of FIG. 2 for illustration purpose only and without limitation, the interference zone/range 210 of the node 202-1 is shown, and the number of hops from node 202-1 to another node 202-4 being within the interference range 210 (e.g., the maximum number of hops from node 202-1 that is still within the interference range 210) is two. As will be explained further later below in various example embodiments of the present invention, the above-mentioned predetermined number is preferably such a number of hops plus two. Therefore, in the example, the number of sets of time slots is determined to be at least four.

In various embodiments, the determined set of time slots is determined amongst the plurality of sets of time slots based on the hop count associated with the node and the number of sets of time slots. In further embodiments, the determined set of time slots is determined amongst the plurality of sets of time slots based on a value obtained from the hop count associated with the node modulo the number of sets of time slots (i.e., remainder of the division of the hop count associated with the node and the number of sets of time slots). In still further embodiments, the plurality of sets of time slots is located separate from each other and in time order in the frame, and the determined set of time slots has a time order associated therewith in the frame satisfying a predefined relationship to such a value obtained. For example, referring back to the example of FIG. 2 for illustration purpose only and without limitation, the number of sets of time slots is four. In this example, the base node 202-1 has a hop count of zero, and thus the set of time slots determined for the base node 202-1 to transmit data packets is determined to be the first set of time slots (in time order) in the frame (e.g., based on the hop count associated with the node modulo the number of sets of time slots, e.g., "0" modulo "4"="0", and a value of "0" may be defined to correspond to the first set of time slots in the frame (predefined relationship)). As another example, node 202-4 has a hop count of two, and thus the set of time slots determined for node 202-4 to transmit data packets is determined to be the second set of time slots (in time order) in the frame (e.g., based on the hop count associated with the node modulo the number of sets of time slots, e.g., "2" modulo "4"="2", and a value of "2" may be defined to correspond to the third set of time slots in the frame (predefined relationship)). It will be appreciated by a person skilled in the art that the present invention is not limited to the above-mentioned predefined relationship, and any form of relationship (function/condition) may be defined for corresponding the above-mentioned value determined to a respective set of time slots in the frame as desired or appropriate. Accordingly, as described hereinbefore, nodes having a hop count satisfying a certain function/condition are effectively grouped together, and the group of such nodes may thus be scheduled based on the frame (comprising the plurality of sets of time slots) to transmit data packets at the same set of time slots.

In various embodiments, the node is scheduled based on the frame to transmit data packets in the determined set of time slots, and the node is configured to randomly select a time slot in the determined set of time slots for transmitting the data packets. In further embodiments, the node is further configured to perform a delay for a random time period from a start of the selected time slot prior to transmitting data packets.

In various embodiments, the node (e.g., each node of the plurality of nodes) is configured to transmit data packets at the selected time slot based on a CSMA protocol, for example and without limitation, a CSMA-based Wi-Fi protocol.

In various embodiments, one of the plurality of nodes is a base node (or interchangeably referred to as reference node), and the hop count of the node in the plurality of nodes is determined based on the number of hops from the base node to the node. The hop count of any other node in the plurality of nodes is also determined based on the number of hops from the base node to such other node.

In various embodiments, the frame further comprises one or more additional time slots reserved for CSMA back-off and auto-retransmission located adjacent an end of each of the plurality of sets of time slots. For example, such additional time slot(s) may be located immediately after the end of the set of time slots assigned to a group of nodes. Accordingly, in various embodiments, the time slots for a group of nodes may comprise a controlled region/section comprising the above-mentioned set of time slots for scheduling data transmission timings of the group of nodes, and a buffered region/section comprising the above-mentioned additional time slots reserved for CSMA back-off and auto-retransmission.

Figure 4:
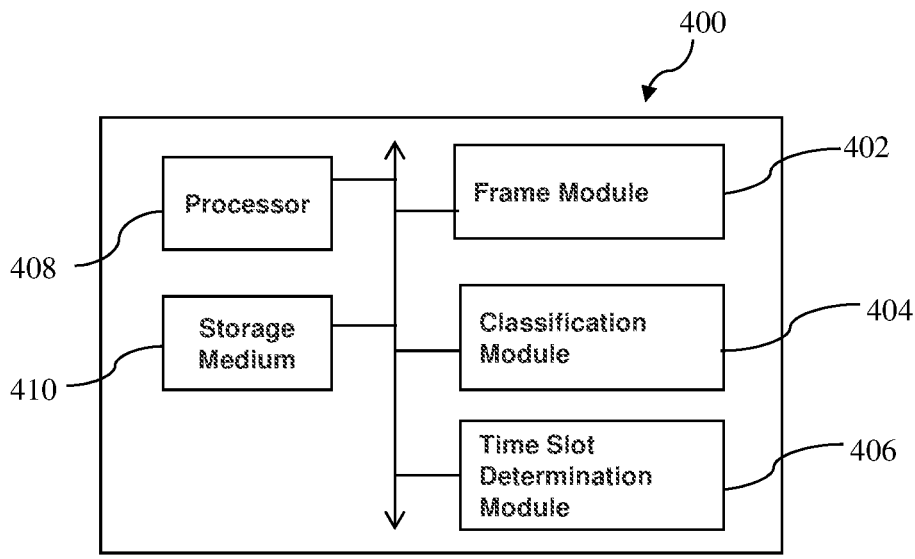
FIG. 4 depicts a schematic drawing of a node in a wireless mesh network according to various embodiments of the present invention.

FIG. 4 depicts a schematic drawing of a node 400 in a wireless mesh network comprising a plurality of nodes capable of transmitting and receiving data packets according to various embodiments of the present invention. The node 400 comprises a frame module/circuit 402 configured to provide or generate a frame comprising a plurality of time slots data transmission (e.g., partitioning a transmission time into the plurality of time slots), a classification module/circuit 404 configured to classify the plurality of time slots into a plurality of sets of time slots (e.g., determining the number of sets of time slots), and a time slot determination module/circuit 406 configured to determine a set of time slots amongst the plurality of sets of time slots for the node to transmit data packets, the set of time slots being determined based on a hop count associated with the node. The node 400 may further comprise a computer processor 408 capable of executing computer executable instructions (e.g., the frame module 402, the classification module 404, and/or the time slot determination module 406) to perform one or more functions or methods (e.g., to determine a set of time slots amongst the plurality of sets of time slots for the node to transmit data packets), and a computer-readable storage medium 410 communicatively coupled to the processor 408 having stored therein one or more sets of computer executable instructions (e.g., the frame module 402, the classification module 404, and/or the time slot determination module 406). It will be appreciated by a person skilled in the art that the node 400 may include any additional modules/components as desired or appropriate, such as a transceiver 106, a display 110, and/or a user interface as shown in FIG. 1B. The node 400 may be capable of establishing communication with the wireless mesh network, such as with other nodes of the wireless mesh network performing data transmission in the wireless mesh network. For example and without limitation, the node 400 may be a mobile/portable device or a fixed device having wireless communication capabilities and configured to be capable of transmitting and receiving data packets in a wireless mesh network.

A computing system, a controller, a microcontroller or any other system providing a processing capability may be presented according to various embodiments in the present disclosure. Such a system may be taken to include one or more processors and one or more computer-readable storage mediums. For example, as mentioned above, the node 400 described herein includes a processor (or controller) 408 and a computer-readable storage medium (or memory) 410 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "providing", "determining", "assigning", "generating", or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system or an apparatus for performing the operations/functions of the methods described herein. Such a system or apparatus may be specially constructed for the required purposes, or may comprise a general purpose computer or other device selectively activated or reconfigured by a computer program stored in the computer. The algorithms presented herein are not inherently related to any particular computer or other apparatus. Various general purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the methods/techniques of the disclosure contained herein. Moreover, the computer program is not intended to be limited to any particular control flow. There are many other variants of the computer program, which can use different control flows without departing from the spirit or scope of the invention. It will be appreciated to a person skilled in the art that various modules described herein (e.g., the frame module 402, the classification module 404, and/or the time slot determination module 406) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of the computer program/module or method may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., the frame module 402, the classification module 404, and/or the time slot determination module 406) executable by one or more computer processors to perform a method 300 of controlling data transmission in a wireless mesh network as described hereinbefore with reference to FIG. 3 or other method(s) described herein. Accordingly, various computer programs or modules described herein may be stored in a computer program product receivable by a computer system or electronic device (e.g., node 400) therein for execution by a processor of the computer system or electronic device to perform the respective functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 5:
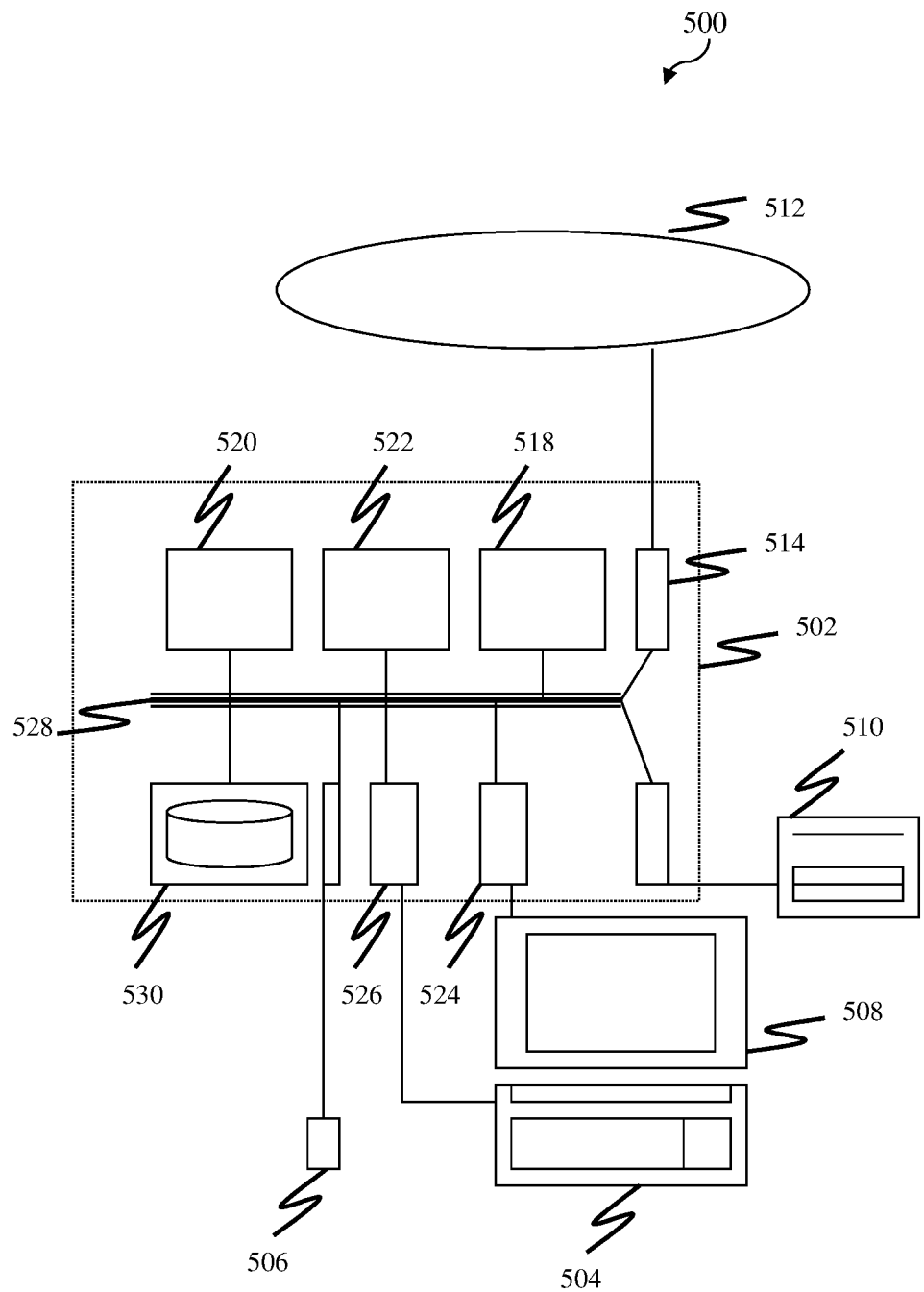
FIG. 5 depicts a schematic drawing of an exemplary computer system.

The methods or functional modules of the various example embodiments as described hereinbefore may be implemented on a computer system (e.g., portable or desktop computer system), such as a computer system 500 as schematically shown in FIG. 5 as an example only. In other words, it can be appreciated that the node 400 may be realized by a computer system. The method or functional module may be implemented as software, such as a computer program being executed within the computer system 500, and instructing the computer system 500 (in particular, one or more processors therein) to conduct the methods/functions of various example embodiments. The computer system 500 may comprise a computer module 502, input modules such as a keyboard 504 and mouse 506 and a plurality of output devices such as a display 508, and a printer 510. The computer module 502 may be connected to a computer network 512 via a suitable transceiver device 514, to enable access to e.g. the Internet or other network systems such as Local Area Network (LAN) or Wide Area Network (WAN). The computer module 502 in the example may include a processor 518 for executing various instructions, a Random Access Memory (RAM) 520 and a Read Only Memory (ROM) 522. The computer module 502 may also include a number of Input/Output (I/O) interfaces, for example I/O interface 524 to the display 508, and I/O interface 526 to the keyboard 504. The components of the computer module 502 typically communicate via an interconnected bus 528 and in a manner known to the person skilled in the relevant art.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Various example embodiments of the present invention provide a hop-count based data transmission technique (method of controlling data transmission) for mesh network which enhance the data transmission scheduling of CSMA with time-division features, that is, hop-count based time-division technique of controlling data transmission. Such a technique has advantageously been found to greatly improve the data delivery rate for large scale mesh network at very low cost.

For the sake of simplicity and without limitation or loss of generality, example embodiments described hereinbefore are based on the Free Space Model, with each node being equipped with an omni-directional antenna. All nodes are also assumed to have the same wireless features.

As described hereinbefore, when a node transmits a message, the wireless signal may cover a circular zone about the node. The circular zone may be divided into two zones/sections, namely, a transmission zone/section and an interference zone/section.

The free space path loss (FSPL) may be determined using the following equation:

$$FSPL(dB) = 20 \log_{10} d + 20 \log_{10} f + 32.45 \quad \text{(Equation 1)}$$

where d is the distance in kilometer (km), and f is the frequency in megahertz (MHz).

Considering the distance component of Equation 1, the FSPL at n times distance (i.e., at n*d) may be obtained using on the following equation:

$$FSPL_{dist}(db) = 20 \log_{10}(n*d) = 20 \log_{10} n + 20 \log_{10} \quad \text{(Equation 2)}$$

Accordingly, given the transmission range d, the signal strength will fade $20 \log_{10} n$ dB at n*d distance. Table 1 below lists the path losses for several values of n.

TABLE 1

| | Path losses contributed by n * d | | | | |
|---|---|---|---|---|---|
| | 1.5d | 2d | 2.5d | 3d | 3.5d |
| Loss$_{nd}$ (dB) | 3.525 | 6.02 | 7.96 | 9.54 | 10.88 |

Therefore, if a wireless signal's strength is $P_d$ at the boundary of transmission range, the signal strength will become ($P_d$-Loss$_{nd}$) at distance n*d. Accordingly, for a node at distance n*d, the received signal strength will obtain an extra noise ($P_d$-Loss$_{nd}$).

In order to correctly demodulate a wireless signal at a node, the signal-to-noise ratio (SNR) at the node must be above a certain value. For example, typical minimal SNR value for Wi-Fi communication may be around 10 dB to 15 dB. Therefore, for Wi-Fi devices, the interference range may be more than three times of transmission range in free space. For some wireless devices, e.g., based on TV White Spaces (TVWS), the minimal SNR value is above 5 dB, therefore, the interference range may be two times of the transmission range.

For the sake of simplicity and without limitation or loss of generality, example embodiments described hereinbefore assume that (unless stated otherwise) the interference range is two times of the transmission range. However, it will be appreciated by a person skilled in the art that the same or similar principle applies to cases where the interference range and the transmission range are at other ratios/proportions.

Referring back to the example of FIG. 2, assuming the two-hop interference, when node 202-1 transmits a message to node 202-2, nodes 202-3 to 202-6 should not transmit messages in order to avoid a collision in data transmission from multiple nodes. However, as described hereinbefore, as an example problem associated with the conventional CSMA protocol, although nodes 202-2 to 202-4 would be aware of the data transmission from node 202-1 (i.e., through RTS and CTS signals), for example, node 202-6 would be totally unaware of the data transmission from node 202-1. As a result, data transmission from node 202-6, which also cannot be detected/sensed by node 202-1, would cause the data packets to be lost at node 202-2. Furthermore, as node 202-3 may receive data transmission from node 202-1, for the data transmission from node 202-1 to be safe from collision, nodes (e.g., node 202-6) at three hops away from node 202-1 may be required to avoid transmitting data when node 202-1 is transmitting data.

Accordingly, it is observed according to example embodiments of the present invention that when a node (with hop count N) is transmitting, nodes with up to three hops away from the transmitting node (e.g., for the linear deployment shown in FIG. 2, nodes with hop count N−3, N−2, N−1, N+1, N+2 and N+3) should not transmit. From the above, it can then be derived according to example embodiments of the present invention that for a wireless mesh network whose interference zone covers m hops (e.g., "the number of hops" described hereinbefore), when a node with N hops is transmitting, nodes with hop count N−(m+1), N−m . . . N+m and N+m+1 should not transmit. Accordingly, various embodiments of the present invention advantageously provide a hop-count based time-division technique which enhances CSMA as existing CSMA techniques/protocols does not solve the above multi-hop interference issue.

In the hop-count based time-division technique according to various example embodiments of the present invention, all nodes in the wireless mesh network are grouped (effectively) according to their respective hop count. Furthermore, each group has pre-allocated time slots to transmit. In particular, nodes that may not cause multiple hop interference may be grouped together such that they can transmit at the same time or in the same set of time slots. On the other hand, nodes that may cause interference to each other may be grouped in different groups to avoid sharing the same time slots or same set of time slots. The hop-count based time-division technique will now be described further below according to various example embodiments of the present invention.

As an initial step in the technique, a base node (e.g., a primary data sink, a gateway, or any predefined/preconfigured node) may be defined. Such a base node may have associated therewith a hop count of zero, and may function as a reference for other nodes in the mesh network to discover their respective hop counts. Subsequently, each node may broadcast control/routing messages, which includes the hop count information. Upon receiving the messages, each node may determine its hop count and then in turn transmits its control/routing messages, including the hop count information. After this process, each node in the mesh network will know its hop count from the base node. Furthermore, all nodes synchronize their time with the base node or a node with less hop count, for example, using network time protocol (NTP) or any other time synchronization protocol/techniques known in the art as desired or appropriate, such as based on GPS. For scheduling data transmission timings for the nodes in the mesh network, each node may divide the transmission time into repeating periods/frames 610, each frame 610 having a time period T, as for example illustrated in FIG. 6. Each frame 610 is partitioned into a plurality of time slots 612, and the number of time slots 612 provided in each frame may be determined as desired or appropriate such as to be sufficient for the number of nodes in the mesh network.

In various example embodiments, all time slots are effectively grouped into at least m+2 groups/sets 614 of time slots 612 (e.g., "classifying the plurality of time slots" as described hereinbefore), "m" being the number of hops being within the interference range as described hereinbefore. Furthermore, the set 614 of time slots (denoted by a group identification, e.g., or Group$_x$) for a node x (i.e., the set of time slots reserved for node x) may be determined based on the hop count associated with node x, and in various example embodiments, using the following equation (e.g., the predefined relationship as described hereinbefore):

$$\text{Group}_x = \text{Hop}_x \% (m+2) \quad \text{(Equation 3)}$$

where "%" denotes the modulo operator, and Hop$_x$ is the hop count associated with node x.

Figure 6:
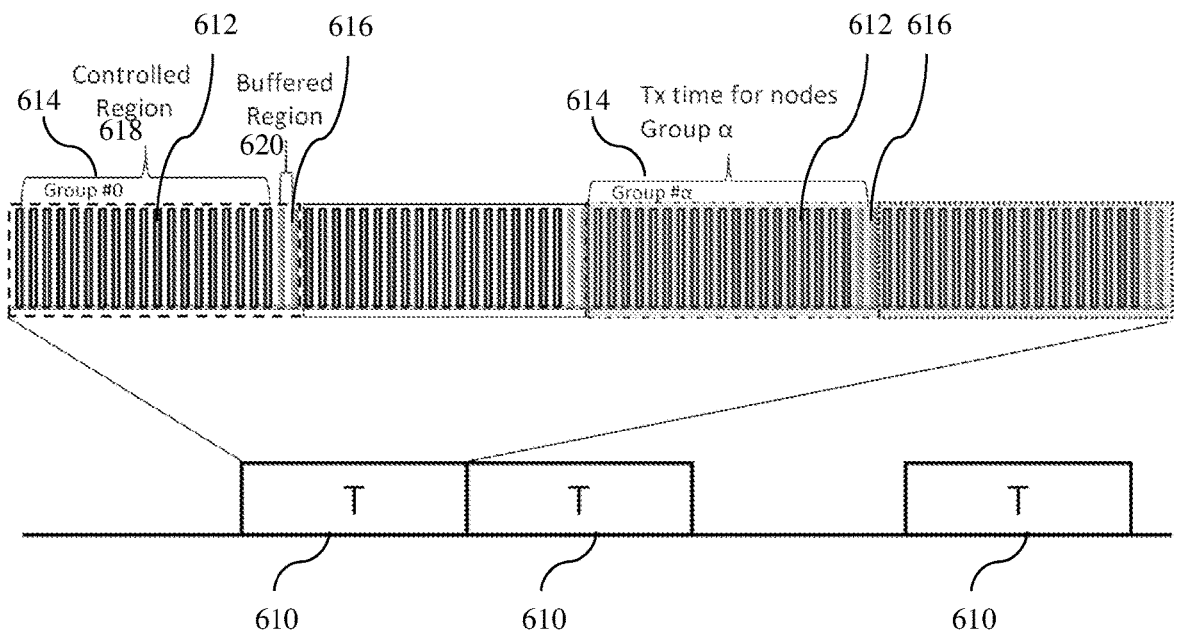
FIG. 6 illustrates a transmission time partitioning according to various example embodiments of the present invention.

From FIG. 6, it can be observed that the plurality of sets 614 of time slots is located separate from each other (i.e., no overlapping transmission time) and in time order in the frame 610. Accordingly, in various embodiments, the determined set of time slots has a time order associated therewith in the frame that satisfies a predefined relationship with the value obtained in Equation 3 above.

In various example embodiments, the frame further comprises one or more additional time slots 616 reserved for CSMA back-off and auto-retransmission for each group of nodes. For example, such additional time slot(s) 616 may be arranged adjacent (immediately after) the end of each set 614 of time slots as illustrated in FIG. 6. Accordingly, the time slots for a group of nodes may comprise a controlled region/section 618 comprising the above-mentioned set 614 of time slots for scheduling data transmission timings (e.g., a region restricted from data transmission by nodes belonging to other groups), and a buffered region/section 620 comprising the above-mentioned additional time slots 616 reserved for CSMA back-off and auto-retransmission. In various example embodiments, node x may randomly select a time slot in the controlled region for its transmission. Furthermore, the node may perform a delay for a random time period from the start of the selected time slot prior to transmitting a message to reduce the chance of collision. Accordingly, the use of a set of time slots provides nodes with, e.g., the same hop count to transmit in the same set of time slots but with possibly different starting times so as to avoid/reduce collisions and improve performance. The node's transmission time also may not go beyond the controlled region.

As referred to above, FIG. 6 illustrates the transmission time partitioning according to various example embodiments of the present invention. As shown in FIG. 6, nodes belonging to a group (e.g., Group α) may randomly select time slots from the group's controlled region 618. Furthermore, the buffered region 620 is provided to contain CSMA backoff and retransmission. It can also be observed that different groups have no overlapping transmission time and nodes that may not cause multiple-hop interference may share the same group (transmission group).

Accordingly, various embodiments of the present invention advantageously use time-division mechanism/technique to address multiple-hop interference, and CSMA to address neighbourhood collision.

As mentioned hereinbefore, for the sake of simplicity, the example of FIG. 2 shows a linear deployment of the exemplary wireless mesh network, that is, the wireless mesh network is defined as a one-dimensional network/system, whereby each node has only one coordinate, namely, the hop count. However, it will be appreciated by the person skilled in the art that the present invention is not limited to a one-dimensional mesh network which is merely illustrated for the sake of simplicity. For example, the mesh network may also be configured as a two-dimensional network or higher, such as a grid network. For a mesh network configured to have a grid structure, nodes with the same hop count may be distributed within a ring whose center may be the base node, such as illustrated in FIG. 7.

Figure 7:
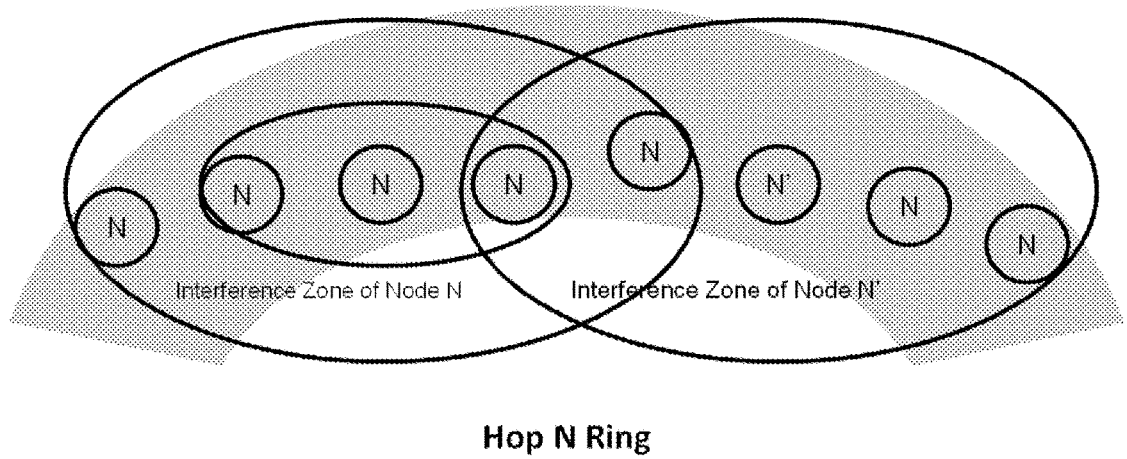
FIG. 7 depicts a schematic drawing of an exemplary wireless mesh network including nodes with same hop count arranged within a ring according to various example embodiments of the present invention.

However, in such a case, multiple-hop interference may be possible between same hop-count nodes, since each node's interference zone may cover part of the ring, as shown in FIG. 7. Despite this, it is demonstrated through experiments (which will be described later below) that the hop-count based data transmission technique described above according to various example embodiments of the present invention is still effective in significantly reducing multiple hop interference in the wireless mesh network having various forms such as a grid form, thus significantly improve data throughput in the mesh network.

In various example embodiments, one or more of the following techniques are implemented to reduce or mitigate the above-mentioned hop ring interference as illustrated in FIG. 7:

Move the base node to corner or edge of the mesh network. This has been found to reduce the number of nodes in the same hop ring;

Message aggregation. This has been found to reduce the message transmissions and reduce the chance of hop ring interference;

Reduce the signal transmission range to reduce the size of hop ring; and/or

Lower the maximum number of packets a node may send in one round.

However, to improve the algorithm further, complex techniques may be required, such as two-dimensional or n-dimensional coordination algorithm. However, such two-dimensional or n-dimensional coordination algorithm may result in costs increasing exponentially and making it infeasible to employ.

Experiments/simulations were conducted in QualNet to test the performance of the hop count based data transmission mechanism. The simulations involved 256 (16×16) nodes, which were configured/arranged in grid formation, and adjacent nodes were separated by a distance of 300 meters (i.e., total area of 4.5 km×4.5 km). One node in the grid was selected as the base node and data sink. The remaining 255 nodes determined their hop counts with respect to the base node and sent constant bitrate (CBR) data to the base node. The packet size of the CBR data was 1000 bytes. The Physical Layer's bandwidth was set to 12 Mbps, and the transmitter and receiver model is based on 802.11a. Each node's radio coverage range was 367 m, each time slot was 5 ms, each cycle (T) consists of 100 time slots.

Two scenarios were simulated, namely, a first scenario (corner scenario) whereby the base node is at a grid corner, and a second scenario (center scenario) whereby base node is in the grid center. The node's hop counts range between 1 and 11 for the second scenario (grid center), and between 1 and 19 for the first scenario (grid corner). Interference range was assumed to be three hops. Therefore, each cycle is divided into five groups, each group consisting of 20 time slots, made up of 19 controlled slots and 1 buffered slot.

During the simulations, the interval of packet generation was adjusted to change the network load. Each scenario was run two times, once for the present hop-count based data transmission technique and another time for the traditional CSMA protocol. The simulation results are presented in a graph shown in FIG. 8.

Figure 8:
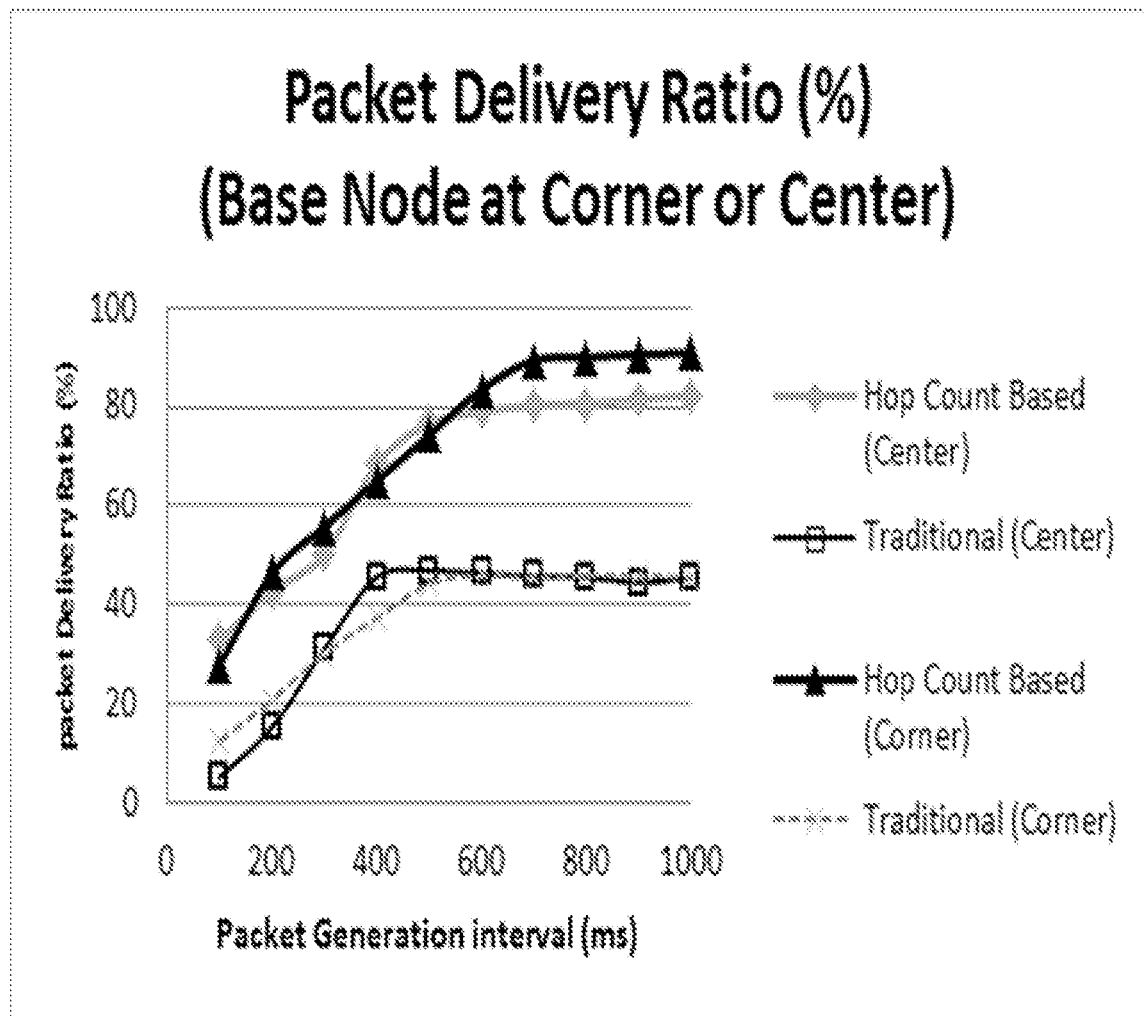
FIG. 8 illustrates simulation results showing the performances (packet delivery ratio comparisons) of the method of controlling data transmission according to various example embodiments and a traditional CSMA data transmission method.

From the graph in FIG. 8, it is evident that the present hop count based data transmission technique achieved significantly better results compared with the traditional CSMA (first-come-first-serve) protocol. The improvements are between about 50% to about 540%. This demonstrates that the present hop count based data transmission technique (method of controlling data transmission) is able significantly reduce the multi-hop interference and improve the network performance for wireless mesh network.

It can also be observed from the graph in FIG. 8 that for the present hop count based data transmission technique, when the base node is at the corner of the network, the result is better (e.g., 90% vs 80%) than the center scenario, when the packet generation rate is not too fast (e.g., greater than 600 ms per packet), even though traffic of corner scenario need to traverse much more hops (max hop count: 19 vs 11).

With the increase of number of packets, more simultaneous transmission happened for nodes with same hop count. The advantage gained through reducing size of hop ring is compensated by the number of simultaneous packets. The corner scenario shows similar results as center scenario, even though it has more hop counts.

For large scale mesh network, multiple hop interference will result serious packet lost. The hop count based data transmission/routing technique according to various embodiments of the present invention is advantageously able improve the data throughput significantly by reducing the multiple hop interference through time-division techniques.

Accordingly, various embodiments of the present invention advantageously provided a simple, low cost, and effective method/technique of controlling data transmission in a wireless mesh network. Furthermore, the method may be readily integrated into existing mesh network with minor software changes and minimal overheads. The above-discussed simulation results also demonstrated that the present method/technique is very effective and is able greatly improve the performance of mesh network.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of controlling data transmission in a wireless mesh network, the wireless mesh network comprising a plurality of nodes capable of transmitting and receiving data packets, the method comprising:
    providing a frame comprising a plurality of time slots for data transmission;
    classifying the plurality of time slots into a plurality of sets of time slots, the plurality of sets of time slots having a number of sets of time slots, the number of sets of time slots being determined based on an interference range of the plurality of nodes, such that the plurality of time slots are classified into the plurality of sets of time slots for a plurality of groups of nodes of the plurality of nodes, respectively, and nodes in the plurality of nodes having respective hop counts associated therewith which are different but satisfy a predefined relationship based on the number of sets of time slots belong to a same group of the plurality of groups of nodes and are able to transmit data packets at a same set of time slots of the plurality of time slots, for avoiding multi-hop interference in data transmission in the frame amongst the plurality of nodes; and
    determining, at a node of the plurality of nodes, a set of time slots amongst the plurality of sets of time slots for the node to transmit data packets, the set of time slots being determined based on a hop count associated with the node.

2. The method according to claim 1, wherein the number of sets of time slots is determined based on the number of hops, from a node to one or more other nodes in the plurality of nodes, being within the interference range.

3. The method according to claim 2, wherein the number of sets of time slots is determined to be equal to or greater than said number of hops plus two.

4. The method according to claim 1, wherein the determined set of time slots is determined amongst the plurality of sets of time slots based on the hop count associated with the node and the number of sets of time slots.

5. The method according to claim 4, wherein the determined set of time slots is determined amongst the plurality of sets of time slots based on a value obtained from the hop count associated with the node modulo the number of sets of time slots.

6. The method according to claim 5, wherein the plurality of sets of time slots is located separate from each other and in time order in the frame, and the determined set of time slots has a time order associated therewith in the frame satisfying a predefined relationship to said value obtained.

7. The method according to claim 1, wherein the node is scheduled based on the frame to transmit data packets in the determined set of time slots, and the node is configured to randomly select a time slot in the determined set of time slots for transmitting the data packets.

8. The method according to claim 7, wherein the node is further configured to perform a delay for a random time period from a start of the selected time slot prior to transmitting the data packets.

9. The method according to claim 7, wherein the node is configured to transmit data packets at the selected time slot based on a Carrier Sense Multiple Access (CSMA) protocol.

10. The method according to claim 9, wherein the frame further comprises one or more additional time slots reserved for CSMA back-off and auto-retransmission located adjacent an end of each of the plurality of sets of time slots.

11. The method according to claim 1, wherein one of the plurality of nodes is a base node, and the hop count of the node is determined based on the number of hops between the base node and the node.

12. A node in a wireless mesh network comprising a plurality of nodes capable of transmitting and receiving data packets, the node comprising:
    a frame module configured to provide a frame comprising a plurality of time slots for data transmission;
    a classification module configured to classify the plurality of time slots into a plurality of sets of time slots, the plurality of sets of time slots having a number of sets of times slots, the number of sets of time slots being determined based on an interference range of the plurality of nodes, such that the plurality of time slots are classified into the plurality of sets of time slots for a plurality of groups of nodes of the plurality of nodes, respectively, and nodes in the plurality of nodes having respective hop counts associated therewith which are different but satisfy a predefined relationship based on the number of sets of time slots belong to a same group of the plurality of time slots for avoiding multi-hop interference in data transmission in the frame amongst the plurality of nodes; and
    a time slot determination module configured to determine a set of time slots amongst the plurality of sets of time slots for the node to transmit data packets, the set of time slots being determined based on a hop count associated with the node.

13. The node according to claim 12, wherein the number of sets of time slots is determined based on the number of hops, from a node to one or more other nodes in the plurality of nodes, being within the interference range.

14. The node according to claim 13, wherein the determined set of time slots is determined amongst the plurality of sets of time slots based on the hop count associated with the node and the number of sets of time slots.

15. The node according to claim 12, wherein the node is scheduled based on the frame to transmit data packets in the determined set of time slots, and the time slot determination module is further configured to randomly select a time slot in the determined set of time slot for transmitting the data packets.

16. The node according to claim 15, configured to transmit data packets at the selected time slot based on a Carrier Sense Multiple Access (CSMA) protocol.

17. The node to claim 12, wherein one of the plurality of nodes is a base node, and the hop count of the node is determined based on the number of hops between the base node and the node.

18. A computer program product, embodied in one or more non-transitory computer-readable storage mediums, comprising instructions executable by one or more computer processors to perform a method of controlling data transmission in a wireless mesh network, the wireless mesh network comprising a plurality of nodes capable of transmitting and receiving data packets, the method comprising:

providing a frame comprising a plurality of time slots for data transmission;

classifying the plurality of time slots into a plurality of sets of time slots, the plurality of sets of time slots having a number of sets of time slots, the number of sets of time slots being determined based on an interference range of the plurality of nodes, such that the plurality of time slots are classified into the plurality of sets of time slots for a plurality of groups of nodes of the plurality of nodes, respectively, and nodes in the plurality of nodes having respective hop counts associated therewith which are different but satisfy a predefined relationship based on the number of sets of time slots belong to a same group of the plurality of groups of nodes and are able to transmit data packets at a same set of time slots of the plurality of time slots, for avoiding multi-hop interference in data transmission in the frame amongst the plurality of nodes; and determining, at a node of the plurality of nodes, a set of time slots amongst the plurality of sets of time slots for the node to transmit data packets, the set of time slots being determined based on a hop count associated with the node.

* * * * *

UNITED STATES PATENT AND TRADEMARK OFFICE
CERTIFICATE OF CORRECTION

PATENT NO. : 10,827,526 B2
APPLICATION NO. : 16/081024
DATED : November 3, 2020
INVENTOR(S) : Qingjun Zhang, Sam Kwok and Kim Hoong Lee Page 1 of 1

It is certified that error appears in the above-identified patent and that said Letters Patent is hereby corrected as shown below:

On the Title Page
Item (73) Assignee: Add -- SINGAPORE POWER LTD, Singapore (SG) -- after "AGENCY FOR SCIENCE, TECHNOLOGY AND RESEARCH, Singapore (SG)".

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*